United States Patent
Soon et al.

(10) Patent No.: US 8,059,549 B2
(45) Date of Patent: Nov. 15, 2011

(54) METHOD AND APPARATUS FOR SUPPORTING NETWORK COMMUNICATIONS USING POINT-TO-POINT AND POINT-TO-MULTIPOINT PROTOCOLS

(75) Inventors: Yee Ming Soon, Tokyo (JP); Chirayu A. Shah, Fremont, CA (US)

(73) Assignee: Tellabs Operations, Inc., Naperville, IL (US)

( * ) Notice: Subject to any disclaimer, the term of this patent is extended or adjusted under 35 U.S.C. 154(b) by 127 days.

(21) Appl. No.: 12/378,662

(22) Filed: Feb. 17, 2009

(65) Prior Publication Data

US 2010/0208593 A1    Aug. 19, 2010

(51) Int. Cl.
G06F 11/00    (2006.01)
(52) U.S. Cl. .................... 370/242; 370/216; 370/401
(58) Field of Classification Search .................. 370/242, 370/390, 401, 395.53, 216
See application file for complete search history.

(56) References Cited

U.S. PATENT DOCUMENTS

| | | | | |
|---|---|---|---|---|
| 7,697,534 | B1* | 4/2010 | Narayanan et al. | 370/392 |
| 2008/0170578 | A1* | 7/2008 | Ould-Brahim | 370/401 |
| 2008/0225695 | A1* | 9/2008 | Balus et al. | 370/216 |
| 2008/0247406 | A1* | 10/2008 | Figueira et al. | 370/401 |
| 2009/0168783 | A1* | 7/2009 | Mohan et al. | 370/395.5 |
| 2010/0128728 | A1* | 5/2010 | Sun et al. | 370/392 |
| 2010/0169718 | A1* | 7/2010 | Tausanovitch et al. | 714/49 |

OTHER PUBLICATIONS

Martini, L., et al., "Encapsulation Methods for Transport of Ethernet over MPLS Networks", Apr. 2006. http://www.ietf.org/rfc/rfc4448.txt, retrieved from the World Wide Web on Apr. 1, 2009.

Sajassi, A., et al., "VPLS Interoperability with Provider Backbone Bridges draft-sajassi-l2vpn-vpls-pbb-interop-02.txt", Nov. 2007. http://tools.ietf.org/html/draft-sajassi-l2-vpls-pbb-interop-02, retrieved from the World Wide Web on Apr. 1, 2009.
Sajassi, A., et al., Customer MAC Address Flushing Mechanisms for Provider Backbone Bridging over VPLS, Jul. 2008. http://tools.ietf.org/html/draft-sajassi-l2vpn-pbb-vpls-cmac-flush-00, retrieved from the World Wide Web on Apr. 1, 2009.
Lasserre, M., et al., Virtual Private LAN Service (VPLS) Using Label Distribution Protocol (LDP) Signaling, Jan. 2007. http://tools.ietf.org/html/rfc4762, retrieved from the World Wide Web on Apr. 1, 2008.

* cited by examiner

Primary Examiner — Albert T Chou
(74) Attorney, Agent, or Firm — Hamilton, Brook, Smith & Reynolds, P.C.

(57) ABSTRACT

Methods and apparatuses are disclosed for interworking a first protocol, e.g., Provider Backbone Bridge Traffic Engineering (PBB-TE), that provides Ethernet carrier-class traffic engineering, with a second protocol, e.g., Virtual Private LAN Service, that emulates local area network (LAN) service. Unicast, multicast, and broadcast transmissions are enabled across an Ethernet aggregation network and an MPLS core network. Dual homing protection and end-to-end traffic engineering with adjustable granularity are also provided. These capabilities are not available with traditional PBB-TE networks or with an interworking between PBB and VPLS that has been previously proposed. Embodiments of the invention terminate a PBB-TE tunnel at a user-facing provider edge (UPE) node and attach instance service identifiers (ISIDs) to different virtual switching instances (VSI)s. As a result, inexpensive Ethernet-only aggregation networks can be designed to interoperate with VPLS with increased reliability and control, benefiting service providers and end users.

45 Claims, 6 Drawing Sheets

METHOD AND APPARATUS FOR SUPPORTING NETWORK COMMUNICATIONS USING POINT-TO-POINT AND POINT-TO-MULTIPOINT PROTOCOLS

BACKGROUND OF THE INVENTION

Modern telecommunications systems employ a variety of technologies to connect nodes across networks. Ethernet (standardized as IEEE 802.3) is a popular data link (OSI Layer 2) technology that is used to create local area networks (LANs). Each node on a LAN is assigned a unique identifier, and Ethernet uses Layer 2 media access control (MAC) addresses for this purpose. In the case of an Ethernet network consisting of a single LAN, all traffic from a given node is broadcast, in the form of data transmission units called frames or packets, to all other nodes. Broadcasting is a simple, yet inefficient, protocol for supporting network communications.

SUMMARY OF THE INVENTION

An embodiment of the invention is a method, or corresponding system, of supporting network communications. The method includes provisioning a user-facing provider edge (UPE) node in an aggregation network and network-facing provider edge (NPE) nodes. The UPE node and the NPE nodes are provisioned to support a first protocol that provides Ethernet carrier-class traffic engineering. The UPE and NPE nodes are also provisioned to support a second protocol that provides emulated local area network (LAN) service across a wide area network (WAN) or a metropolitan area network (MAN). Using these two protocols, the method provides point-to-point and point-to-multipoint services between end nodes communicating with each other via the aggregation and core networks. The UPE node and an access-side edge node of the aggregation network maintain connectivity signaling with each other. The UPE node and the access-side edge node are provisioned to support encapsulation and functionality according to the first protocol, and the NPE nodes are provisioned to support encapsulation and functionality according to the second protocol to support network communications between the end nodes.

Another embodiment of the invention is a method, or corresponding apparatus, of supporting network communications. In this embodiment, service packets may be extracted from a tunnel at a UPE node in an aggregation network. The tunnel corresponds to a first protocol that provides carrier-class traffic engineering, such as Ethernet carrier-class traffic engineering. The service packets may be attached to different virtual switching instances (VSIs) in a core network for transmission according to a second protocol, which provides emulated local area network (LAN) service across a WAN or a MAN, to provide point-to-point and point-to-multipoint services between end nodes communicating with each other via the aggregation network and the core network.

BRIEF DESCRIPTION OF THE DRAWINGS

The foregoing will be apparent from the following more particular description of example embodiments of the invention, as illustrated in the accompanying drawings in which like reference characters refer to the same parts throughout the different views.

The drawings are not necessarily to scale, emphasis instead being placed upon illustrating embodiments of the present invention.

DETAILED DESCRIPTION OF EMBODIMENTS OF THE INVENTION

Figure 1:
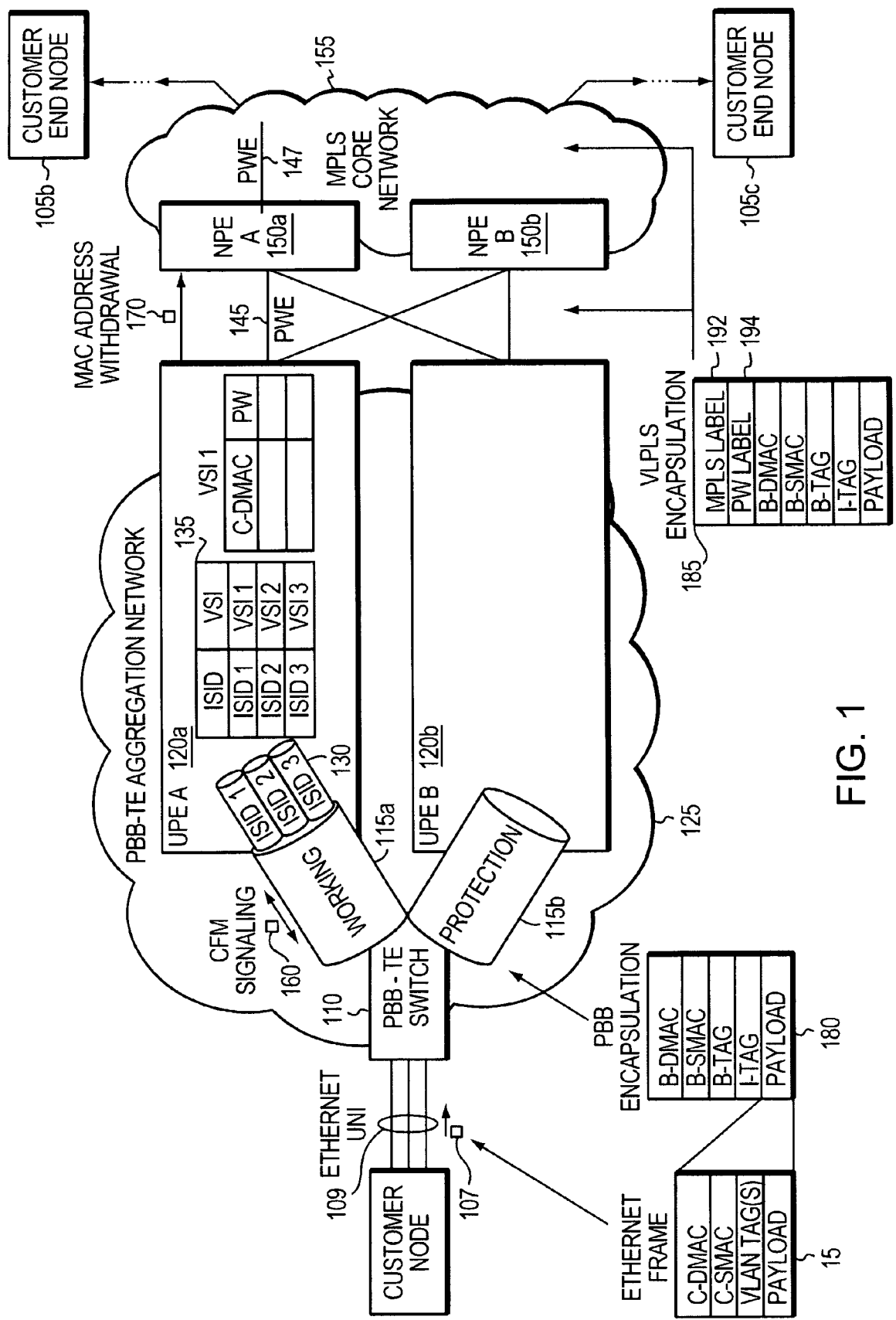
FIG. 1 is a network diagram that provides an overview of a network configuration providing interoperability between Provider Backbone Bridge Traffic Engineering (PBB-TE) and Virtual Private LAN Service (VPLS) networks according to an embodiment of the invention.

A description of example embodiments of the invention follows.

Through the establishment of network traffic tunnels, which are inherently point-to-point in nature, Provider Backbone Bridge Traffic Engineering (PBB-TE) loses an ability to transmit point-to-multipoint and broadcast data. PBB-TE also does not inherently support unknown unicast traffic. In end-to-end PBB-TE tunnels, fine-grained traffic engineering on transit nodes is not possible since Instance Service Identifier (ISID) values are only visible (and thus meaningful) at the ends of tunnels.

Using conventional Provider Backbone Bridge (PBB) technology offers multicasting and broadcasting capabilities at the cost of losing dual homing capability. Dual homing refers to a network topology in which a network element is connected to a network by means of two independent access points (attachment points) for redundancy and reliability. Also, traditional PBB does not offer granularity control of user traffic at core and transit nodes.

In embodiments of the invention, the aggregation network at which services are provided uses pure Ethernet, as opposed to Multi-Protocol Label Switching (MPLS). Thus, switches in the aggregation network are simple and inexpensive. In contrast, using MPLS in aggregation as well as core networks (as in the conventional art) would increase the complexity of both networks, raising the costs of equipment acquisition and maintenance.

Embodiments of the present invention enable interoperability between PBB-TE and VPLS networks, which has not been available previously without sacrificing user plane interworking, reliability (e.g., dual homing), operations, administration and management (OAM), and quality of service (QoS). PBB-TE tunnels are used in the aggregation network to enable deterministic paths, fine-grained traffic engineering, and MAC address hiding. By terminating a PBB-TE tunnel at an intermediate point (user-facing provider edge node, ("UPE node")) before ingress to a VPLS network, as opposed to running the tunnel transparently across the VPLS network, information inside the tunnel can be used to advantage. Specifically, customer service information in the form of ISID values can be extracted and attached to virtual switching instances (VSIs) of the VPLS on a per-ISID basis or a per-tunnel basis to offer a desired level of granularity in traffic engineering (e.g., for traffic QoS, bandwidth, and forwarding policies). Network designers can choose a granularity in which different ISID values correspond to different customers, or they may choose to differentiate ISID values based on services. Attachment of ISID values to multiple VPLS pseudowires (on the pseudowire emulation edge-to-edge ("PWE3") interface), as in embodiments of the invention, can enable multicasting bridging in a PBB-TE network, which is traditionally point-to-point. Additional PBB framing is added on customer frames exiting the UPE node towards the MPLS core, i.e., on the PWE3 interface, to increase MAC scalability within the VPLS network towards the core. Thus, MAC scaling is achieved end-to-end, without compromising user traffic granularity and control.

Traditionally, PBB-TE has been used for point-to-point communications, which entails running a PBB-TE tunnel transparently end-to-end, so there has not been motivation to terminate a PBB-TE tunnel for intermediate processing.

Formerly, PBB could have been used for multipoint transmission, but PBB relies on Rapid Spanning Tree Protocol (RSTP), which is disadvantageously nondeterministic. Such nondeterminism may result in delays and does not scale well. Alternatively, PBB-TE could have been used for point-to-point transmission, with a parallel PBB network used for point-to-multipoint transmission, but that would require a separate network, which is expensive.

Furthermore, as described above and also in reference to some embodiments, dual homing capability with fast, deterministic switchover is possible in a combined PBB-TE/VPLS network employing intermediate tunnel termination. This is achieved by appropriate architectural configuration (provisioning of working and protection PBB-TE tunnels) and signaling (withdrawing backbone MAC addresses in the case of failure in a working tunnel to force flushing and relearning by other network elements). The PBB-TE portion of the network converges within 50 ms, and the MPLS portion also converges within 50 ms using the MPLS Resource Reservation Protocol (RSVP) Fast Reroute (FRR) mechanism. Ethernet service protection involving MAC flushing converges in under one second. Thus, end-to-end protection in under one second is achieved across multiple distinct domains (PBB-TE and MPLS), with infrastructure protection consistently converging within 50 ms.

Prior to the approach embodied in the present invention, industry use of PBB-TE as in 802.1Qay focused on only single-homed source-destination tunnels, which introduce a single point of failure at source or destination ends. This type of drawback (single point of failure) can be mitigated by using a full mesh of end-to-end tunnels connecting MPLS edge nodes. However, a full mesh would require N*(N−1)/2 tunnels for N nodes, which would be resource-intensive. Furthermore, using end-to-end tunnels in that manner would preclude granular traffic engineering, as described above, since intermediate nodes would only be able to access backbone (not customer) MAC addresses.

Embodiments of the invention provide methods and apparatuses for Provider Backbone Bridge Traffic Engineering (PBB-TE) and Multi-Protocol Label Switching (MPLS) interworking.

An embodiment of the invention is a method, or a corresponding system, of supporting network communications. The method includes provisioning a user-facing provider edge (UPE) node in an aggregation network and network-facing provider edge (NPE) nodes. The UPE node and the NPE nodes are provisioned to support a first protocol that provides carrier-class traffic engineering, such as Ethernet carrier-class traffic engineering. The UPE and NPE nodes are also provisioned to support a second protocol that provides emulated local area network (LAN) service across a wide area network (WAN) or a metropolitan area network (MAN). Using these two protocols, the method provides point-to-point and point-to-multipoint services between end nodes communicating with each other via the aggregation and core networks. The UPE node and an access-side edge node of the aggregation network are provisioned to support encapsulation and functionality according to the first protocol, and the NPE nodes are provisioned to support encapsulation and functionality according to the second protocol to support network communications between the end nodes.

The first protocol may be Provider Backbone Bridge Traffic Engineering (PBB-TE), and the second protocol may be Virtual Private LAN Service (VPLS).

The method may further include provisioning primary and backup PBB-TE tunnels between the access-side edge node and parallel UPE nodes. The UPE node may be enabled to issue a media access control (MAC) address withdrawal signal following an instantiation of one of the PBB-TE tunnels. In another embodiment, the UPE node is enabled to issue a media access control (MAC) address withdrawal signal to a corresponding NPE node in an event of detecting a fault in one of the primary or backup PBB-TE tunnels.

A PBB-TE tunnel may also be instantiated between the UPE node and the access-side edge node, and service packets may be extracted from the tunnel. In this embodiment, multiple virtual switching instances (VSIs) are provisioned between NPE nodes in the core network. The UPE node maintains a table that includes a mapping between instance service identification (ISID) values and VSIs. The extracted service packets are attached to different VSIs in the core network based on data retrieved from the table.

A multicast frame that is received on a PBB-TE tunnel may also be flooded on all tunnels, pseudowires, or ports coupled to a VSI in the UPE node.

The method may also include monitoring for a continuity check message (CCM) failure and issuing the MAC address withdrawal signal in response to detecting the CCM failure. The method may also include sending a remote defect indication (RDI) from the access-side edge node to the UPE node in response to detecting the CCM failure.

Customer MAC address learning may be enabled based on ISID values belonging to a PBB-TE tunnel.

Another embodiment of the invention is a method, or corresponding apparatus, of supporting network communications. In this embodiment, service packets are extracted from a tunnel at a UPE node in an aggregation network. The tunnel corresponds to a first protocol that provides Ethernet carrier-class traffic engineering. Then, the service packets are attached to different virtual switching instances (VSIs) in a core network for transmission according to a second protocol, which provides emulated local area network (LAN) service across a WAN or a MAN, to provide point-to-point and pointto-multipoint services between end nodes communicating with each other via the aggregation network and the core network.

In the above method, the first protocol may be Provider Backbone Bridge Traffic Engineering (PBB-TE), and the second protocol may be Virtual Private LAN Service (VPLS).

The method may further include issuing a media access control (MAC) address withdrawal signal following an instantiation of the PBB-TE tunnel. The MAC address withdrawal signal may also be issued in an event of detecting a fault in the PBB-TE tunnel.

The method may also include monitoring for a continuity check message (CCM) failure and issuing the MAC address withdrawal signal in response to detecting the CCM failure. The MAC address withdrawal signal may be issued based on a remote defect indication (RDI) received at the UPE node from an access-side edge node of the aggregation network.

The method may also include learning customer media access control (MAC) addresses on instance service identification (ISID) values belonging to the PBB-TE tunnel.

The UPE node may maintain a table that includes a mapping between instance service identification (ISID) values and the VSIs. The service packets are attached to different VSIs based on data retrieved from the table.

The PBB-TE tunnel may be instantiated between the UPE node and an access-side edge node of the aggregation network. A multicast frame that is received on the PBB-TE tunnel may be flooded on all tunnels, pseudowires, or ports coupled to one of the VSIs.

Before presenting details of the foregoing example embodiments, a brief description of the relevant protocols is presented.

Virtual LANs (VLANs) address some of the efficiency problems of LANs (e.g., high number of traffic collisions) by segmenting a single Ethernet LAN into multiple broadcast domains, with each frame tagged with a VLAN identifier according to the IEEE 802.1Q standard. A switch (also known as a bridge) serves as the boundary between broadcast domains, forwarding traffic destined for nodes in a different broadcast domain and filtering (not forwarding) traffic destined for nodes in the same broadcast domain. When first connected to an Ethernet VLAN, a switch has no knowledge of the MAC addresses of nodes on the network. Each switch monitors network traffic, and for each detected packet, the switch adds the MAC source address of the sending node, as well as the port (interface) on which the address was learned, to the switch's Ethernet switching table.

If a packet received by a switch has a destination MAC address corresponding to an entry in the switching table, the switch forwards or filters the packet accordingly. If the destination address is not in the switching table, the switch floods the packet on all outgoing interfaces except the interface on which the packet was received (or on all outgoing interfaces if the traffic originated at the switch). Eventually, one of the flooded packets will reach the intended destination node, which will then reply to the switch so that that node's address may be added to the switching table. This process is known as MAC address learning.

MAC address learning poses scalability issues as the number of customer MAC addresses increases. This is because the broadcast transmissions that accompany MAC address learning result in nondeterministic behavior throughout the network and may result in network slowdowns. 802.1Q VLANs also suffer from a scalability problem related to the VLAN tag (or ID). Since this tag, which is used to identify customer service instances, is 12 bits, only 4094 (i.e., $2^{12}$) service instances are possible (since VLAN ID values of 0 and 4095 are reserved).

In response to these scalability concerns, a technique called Provider Backbone Bridge (PBB) has been developed and standardized as IEEE 802.1ah. In the PBB architecture, customer networks are aggregated (into aggregation networks) and then connected to provider core networks for transmission across a core backbone. PBB adds the following fields to an Ethernet frame: 1) backbone destination MAC address (B-DMAC); 2) backbone source MAC address (B-SMAC); 3) backbone tag (B-tag); and 4) Instance tag (I-tag). The B-DMAC and B-SMAC fields effectively hide customer MAC addresses in a network core, since only backbone addresses will be visible to core network elements for forwarding and learning. This technique is known as MAC-in-MAC encapsulation and substantially reduces the number of MAC addresses the core network elements have to learn and to which traffic must be forwarded.

Since the I-tag includes a 24-bit service identifier (ISID) identifying a service customer, PBB allows for much more scalability than 802.1Q in terms of the number of service instances ($2^{24}$, or about 16 million) that may be accommodated. Furthermore, since PBB identifies backbone VLANs through a backbone VLAN ID (BVID) which is part of the B-tag and thus separate from the ISIDs, PBB segregates customer services and provider VLANs. This offers network designers the flexibility to choose network topologies (e.g., the number of VLANs) independently of the customer service instances that must be supported.

Provider Backbone Bridge Traffic Engineering (PBB-TE) is a variant on PBB which offers greater control to network designers through explicit static configuration (provisioning) of network elements instead of traditional flooding and learning techniques. PBB-TE, formerly known as Provider Backbone Transport (PBT), is standardized in IEEE 802.1Qay. PBB-TE establishes point-to-point Ethernet tunnels which may reserve bandwidth and support quality of service (QoS) metrics. By disabling multicasting/broadcasting and traditional MAC address learning, PBB-TE enables deterministic paths and reduces congestion. Thus, PBB-TE offers carrier-grade reliability and enables traffic engineering through a management plane.

Multi-Protocol Label Switching (MPLS) is a technology that has gained favor for use in core networks. In an MPLS network, routers do not need to consult IP routing tables, which may impose memory limitations, to determine where to forward incoming traffic. Rather, MPLS establishes fixed paths (known as label-switched paths, or LSPs) from one end of the network to another. Routers in the MPLS network check a label and destination associated with the packet and send the packet to the next router on the fixed path (including the present router) corresponding to the label.

MPLS may be used to implement Virtual Private LAN Service (VPLS), which is a Layer 2 service that emulates LAN service across a large region, such as a Wide Area Network (WAN) or a Metropolitan Area Network (MAN). VPLS makes it possible to interconnect LAN segments over a packet switch network and makes the remote LAN segments behave as a single LAN. A VPLS is composed of Virtual Switching Instances (VSIs), which serve as nodes, and pseudowires (PWs), which serve as edges. A pseudowire is an emulated point-to-point connection provided over a packet switched network. Ethernet packets are forwarded by a VSI to the appropriate pseudowire for transport across the VPLS network.

FIG. 1 is a network diagram that provides an overview of a network configuration providing interoperability between Provider Backbone Bridge Traffic Engineering (PBB-TE) and Virtual Private LAN Service (VPLS) networks according to an embodiment of the invention. FIG. 1 shows a customer end node 105a communicating with customer end nodes 105b and 105c (i.e., multicasting in this example configuration) by means of an aggregation network 125 and a core network 155. Service providers may provide services at the aggregation network 125 and send traffic to the core network 155 for efficient, service-agnostic transmission. In embodiments of the invention, the aggregation network 125 is a pure Ethernet network using simple Ethernet switching. To alleviate scalability concerns, PBB-TE is used in the aggregation network 125. MPLS is used to implement VPLS in the core network 155 in some invention embodiments.

In operation, the customer node 105a transmits an Ethernet frame 107 to a PBB-TE switch 110 via an Ethernet user network interface (UNI) 109. The switch 110 performs local switching based on customer MAC (C-MAC) addresses on both upstream (from end users) and downstream ports. An 802.1Q and/or 802.1Q-inQ VLAN ID are added by the switch 110. The PBB-TE switch 110 then transmits PBB-encapsulated (same as PBB-TE-encapsulated) packets upstream to a User-Facing Provider Edge (UPE) node (UPE A) 120a via a PBB-TE tunnel 115a. Alternatively, traffic may also be sent to a different UPE node (UPE B) 120b via a different tunnel 115b, as the tunnels 115a and 115b are configured as working and protection tunnels, respectively.

UPE A 120a terminates the PBB-TE tunnel 115a and extracts packets associated with different customer services indicated by ISID values 130 (e.g., ISIDs 1-3). UPE A 120a maintains a table 135 mapping ISID values to VSIs (e.g., ISIDs 1-3 are mapped to VSIs 1-3, respectively). Using customer destination MAC (C-DMAC) addresses from extracted packets, the incoming packets may be associated with outgoing pseudowires on a per-VSI basis, as illustrated for VSI 1 140. In some embodiments, a different table is maintained for each VSI for this purpose; in others, a single table is used (e.g., using VSI as a dimension or column). Using ISID information in this way enables fine-grained traffic engineering, which is not possible with traditional PBB-TE tunnels that hide ISID values across a PBB-TE/VPLS network. In the example of FIG. 1, UPE A 120a learns customer MAC addresses on ISID values belonging to the PBB-TE tunnel 115a, and subsequent nodes, e.g., network-facing provider edge (NPE) nodes and provider edge (PE) nodes in the MPLS core network 155, learn backbone MAC addresses instead.

NPE node A is connected to UPE A 120a and UPE B 120b (in a dual homing configuration) via a Pseudowire Emulation (PWE) interface 145. PWE is also referred to as Pseudowire Emulation Edge-to-Edge (PWE3) in this context, and it emulates a point-to-point connection over a packet-switched network. The terms PW, PWE, and PWE3 may be used interchangeably in the context of the present invention. NPE B 150b is similarly connected via PWE interfaces to UPE A 120a and UPE B 120b. NPE A 150a transmits outgoing packets on another PWE interface 147 to other nodes in the MPLS core network 155. On the other side of the MPLS core network 155, a similar topology results in transmission of packets from an NPE to a UPE and then to a PBB-TE switch and finally to customer end nodes 105b and 105c. Thus, embodiments of the present invention enable point-to-multipoint transmission across PBB-TE aggregation network 125 and MPLS core network 155 providing VPLS. Furthermore, this technique provides dual homing protection as well as multi-point bridging in PBB-TE, which is traditionally only point-to-point.

For the return path, edge nodes (e.g., UPE A 120a and UPE B 120b) in the PBB-TE aggregation network 125 determine the appropriate PBB-TE tunnel on which to send packets. Traditional PBB-TE does not allow for this functionality. In embodiments of the invention, MAC addresses are learned at PBB-TE tunnels (either on a per-tunnel basis or on a per-ISID basis within the tunnel), so that destination MAC addresses may be mapped to a tunnel for the return path.

Also shown in FIG. 1 are the packet formats at various stages in the network. In this example, the Ethernet frame (i.e., packet) 107, which is sent to the PBB-TE switch 110, has a standard Ethernet format 175. This standard Ethernet format includes a customer destination MAC address (C-DMAC), a customer source MAC address (C-SMAC), one or more VLAN tags (one if 802.1Q is used; two if 802.1QinQ is used) indicating a virtual LAN, and a payload. Packets in the PBB-TE tunnels 115a and 115b have a format 180 according to PBB encapsulation. According to PBB MAC-in-MAC encapsulation per 802.1ah, backbone destination and source MAC addresses B-DMAC and B-SMAC are appended to hide customer MAC addresses, which become part of the payload. The B-SMAC address of the 802.1ah header is assigned the MAC address of the switch 110. The B-DMAC address of the 802.1ah header has no significance, since no MAC learning is performed on transit tunnel nodes, but it is assigned the MAC address of UPE A 120a in some embodiments. Other PBB headers include a B-Tag, which includes a backbone VLAN identifier (BVID) that is the identifier of the tunnel (and which may be used to identify the tunnel on which to run 802.1ag connectivity check messages), and an I-tag, which contains an ISID. The entire frame format 175 becomes the payload of frame format 180, according to the principle of encapsulation.

UPE nodes 120a and 120b strip the PBB headers upon ingress (to access ISID and C-DMAC information) and adds VPLS encapsulation at egress, as indicated by a format 185. VPLS encapsulation 185 includes C-DMAC, C-SMAC, VLAN tags and payload. An MPLS label 192 and a PW label 194 are also added. These two labels may be modified by routers (not shown) within the core network, but the other fields remain the same throughout the core network 155. In some embodiments, PBB encapsulation may be added in addition to VPLS encapsulation at egress. NPE nodes 150a and 150b, at entry points in the MPLS core network 155, use outgoing VPLS encapsulation 185 for transmission across the MPLS core network 155.

Also shown in FIG. 1 are the signals sent between various network elements. Connectivity fault management (CFM) signals 160 are exchanged between the PBB-TE switch 110 and UPE A 120a. These signals are used to determine if a link has failed. If the working (primary) PBB-TE tunnel 115a fails, the PBB-TE switch 110 transmits a Remote Defect Indication (RDI) 165 to UPE A 120a and then switches to the protection (backup) tunnel 115b. If a new PBB-TE tunnel is instantiated or if a failure is detected in an existing PBB-TE tunnel, a UPE node (e.g., UPE A 120a) transmits a MAC address withdrawal signal (e.g., MAC address withdrawal type/length/value (TLV) according to the known art) to a corresponding NPE node (e.g., NPE A 150a). MAC address withdrawal enables devices that learn and forward based on B-MAC addresses (e.g., nodes in a core backbone network) to flush their MAC address information.

Figure 2:
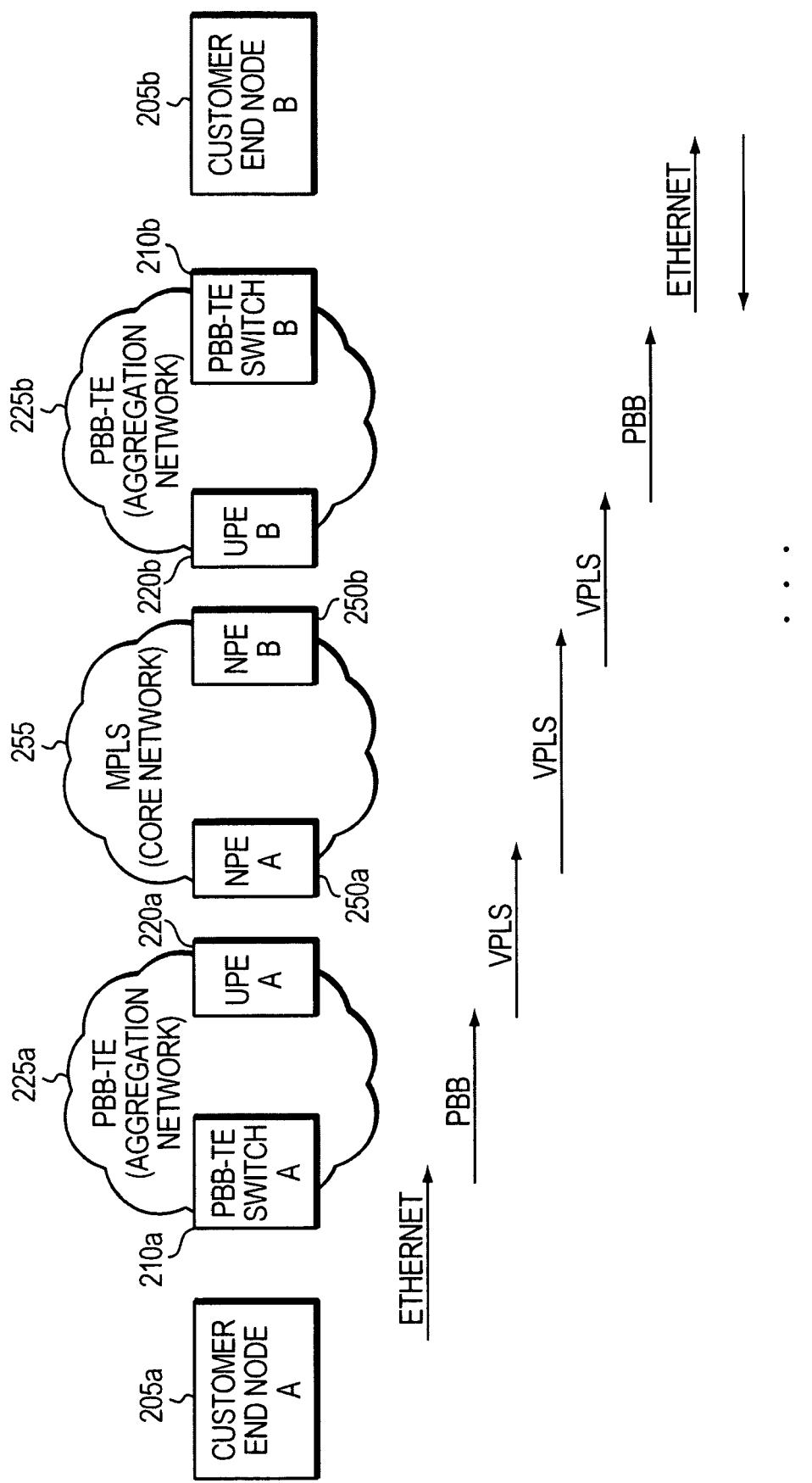
FIG. 2 is a data transmission diagram that illustrates end-to-end data transmission according to an embodiment of the invention.

FIG. 2 is a data transmission diagram that illustrates end-to-end data transmission according to an embodiment of the invention. A customer end node A 205*a* transmits Ethernet frames to a PBB-TE switch A 210*a*. PBB Encapsulation is then used to transmit data across a PBB-TE aggregation network 225*a* to UPE A 220*a*, which then transmits VPLS packets to NPE A 250*a*. In another embodiment, PBB encapsulation may be used in addition to VPLS encapsulation between UPE A 220*a* and NPE A 250*a*. NPE A 250*a* uses VPLS encapsulation to transmit data across an MPLS core network 255 to another NPE node, e.g., NPE B 250*b*. The reverse process is used to send data to UPE B 220*b* in a PBB-TE aggregation network 225*b*, to PBB-TE switch B 210*b*, and to a customer end node B 205*b*. It is understood that traffic may also be sent in the reverse direction using corresponding communications protocols.

Figure 3:
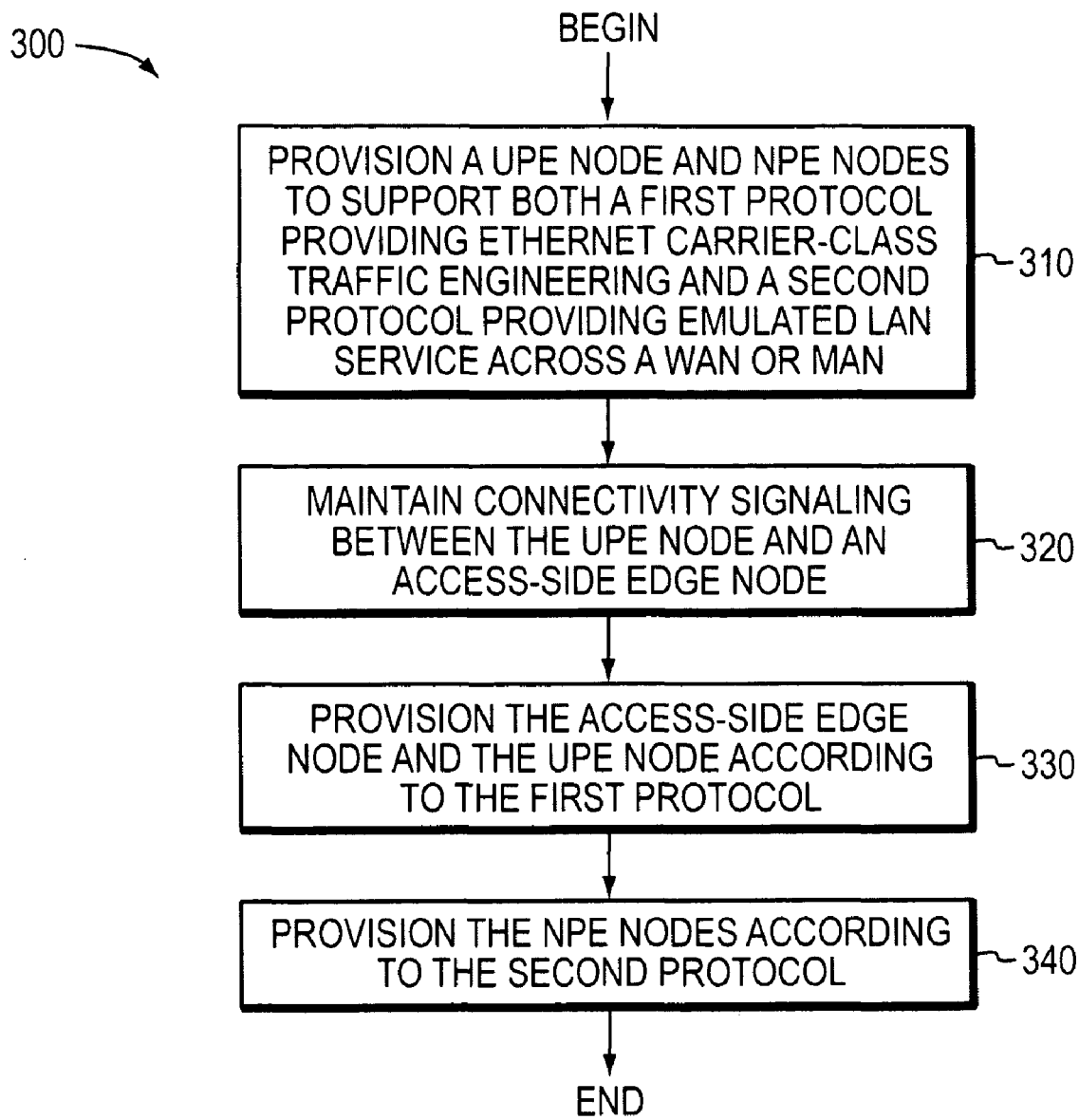
FIG. 3 is a flow diagram of a method performed in a context of a network according to an embodiment of the invention.

FIG. 3 is a flow diagram of a method performed in a context of a network according to an embodiment of the invention. A UPE node and NPE nodes are provisioned (310) to support both a first protocol, for example, PBB-TE, providing Ethernet carrier-class traffic engineering, and a second protocol, for example, VPLS, providing emulated LAN service across a WAN or MAN, to provide point-to-point and point-to-multi-point services between end nodes communicating with each other via aggregation and core networks. Connectivity signaling is maintained (320) between the UPE node and an access-side edge node of the aggregation network. The access-side edge node and the UPE node are provisioned (330) to support encapsulation and functionality according to the first protocol. The NPE nodes are provisioned (340) to support encapsulation and functionality according to the second protocol. While the actions in FIG. 3 are shown to occur in a particular exemplary sequence, it is understood that they may occur in other sequences as well.

Figure 4:
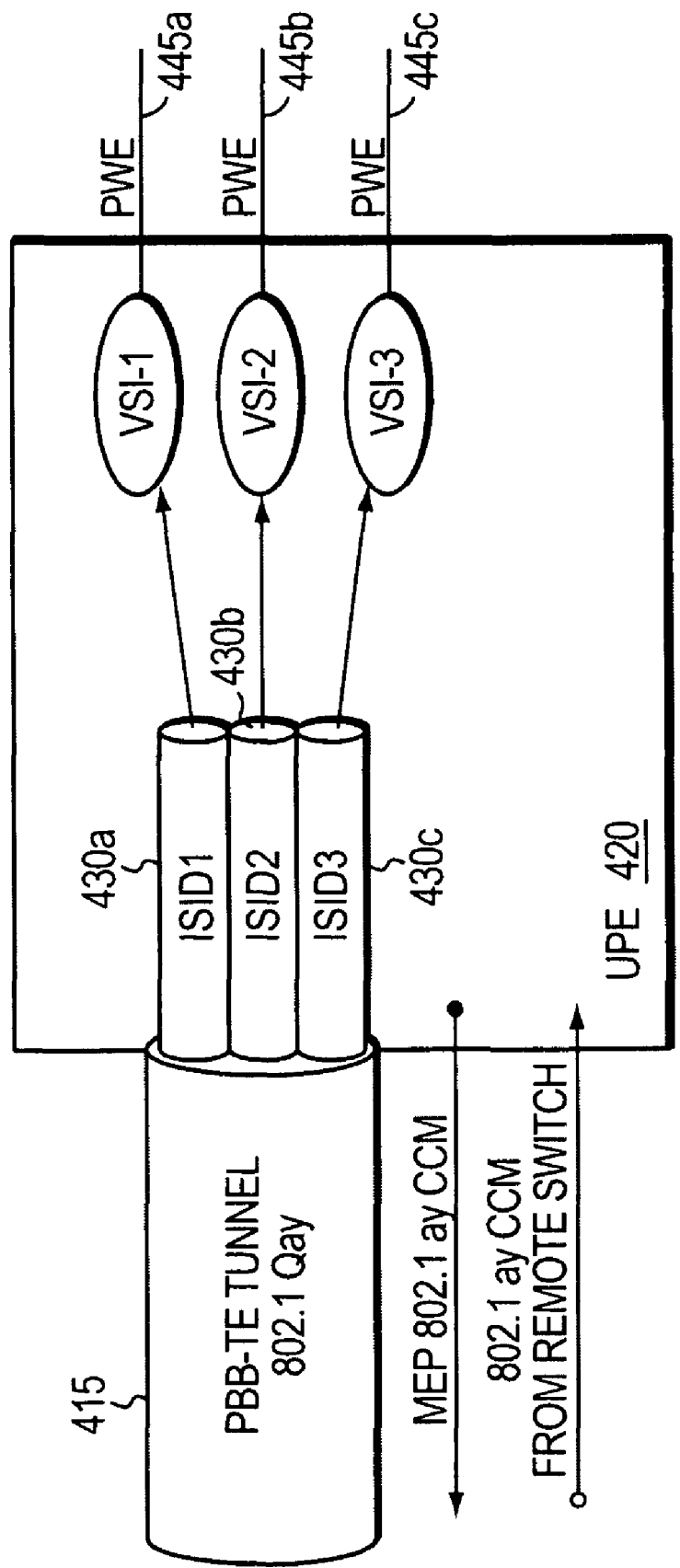
FIG. 4 is a traffic diagram that illustrates an interface between ISIDs and VSIs according to an embodiment of the invention.

FIG. 4 is a traffic diagram that illustrates an interface between ISIDs and VSIs according to an embodiment of the invention. A UPE 420 terminates a PBB-TE tunnel 415 and extracts ISID values 430*a-c*, which are used as service delimiters and identifiers to be associated into virtual private network (VPN) instances such as VSIs 440*a-c*. The PBB-TE tunnel 415 can be viewed as an emulated physical interface plugging into the UPE 420. In this example, the UPE 420 attaches each ISID to a different VSI (e.g., VSIs 440*a-c*) for transmission across pseudowires (interfaces 445*a-c*) associated with the VSIs. In an alternate embodiment (not shown), multiple ISIDs attach to a single VSI. FIG. 4 shows that the UPE 420 is a maintenance endpoint (MEP) for connectivity check messages (CCMs) according to 802.1ag connectivity fault management. A remote PBB-TE switch (not shown) at the other end of the tunnel 415 is the other MEP.

Figure 5:
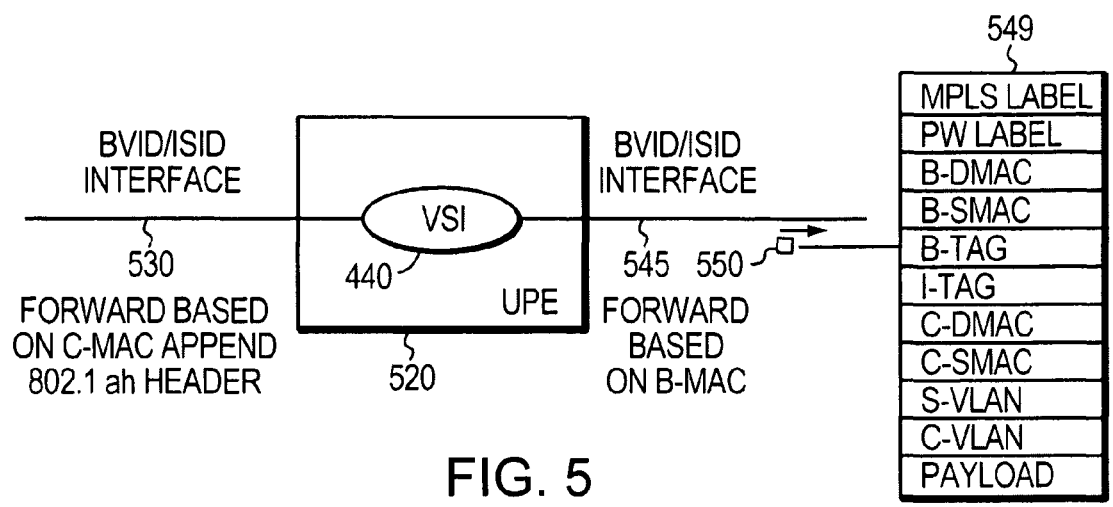
FIG. 5 is a traffic diagram that illustrates functionality of a user-facing provider edge (UPE) node according to an embodiment of the invention.

FIG. 5 is a traffic diagram that illustrates functionality of a user-facing provider edge (UPE) node according to an embodiment of the invention. A UPE 520 is the first point of entry for end users' frames for multipoint switching. The UPE 520 provides for multipoint switching of user frames within the PBB-TE domain, as well as across the MPLS cloud 155 (FIG. 1) towards other PBB-TE domains. The UPE 520, at ingress, terminates PBB-TE tunnels at a BVID/ISID interface 530, surfacing CMAC information from end users. The UPE 520 strips 802.1ah headers and joins VSIs (e.g., VSI 540) based on information extracted from the packets (e.g., ISID and C-DMAC information). The UPE 520 learns and switches based upon customer MAC addresses. At egress, the UPE 520 appends a VPLS header 549 to frame 550 for transmission on PWE interface 545. All CMAC addresses are hidden on the outgoing PWE interface 545. Outgoing frame 550, which is forwarded based on a backbone MAC address, has PBB format 549, which includes backbone source and destination MAC addresses, B-tag, I-tag, customer source and destination MAC addresses, VLAN tags (1 if 802.1Q, 2 if 802.1Q-in-Q), and payload. The B-SMAC address will correspond to the UPE 520, and the B-DMAC address will correspond to a destination UPE. For all Address Resolution Protocol (ARP) frames (e.g., for unknown unicast) or multicast/broadcast frames originated from the users, the destination PBB address is set at FFFFFFFFFFFF. In some embodiments, customer control packets with multicast have destination addresses that are encapsulated within broadcast 802.1ah frames for simplicity.

The UPE 520 associates a PBB B-MAC table to an outgoing PWE attachment circuit in order to forward PBB frames between UPE nodes. The UPE 520 also builds a CMAC forwarding table (540), based on ISID values, in order to forward end user frames between UPE nodes.

Figure 6:
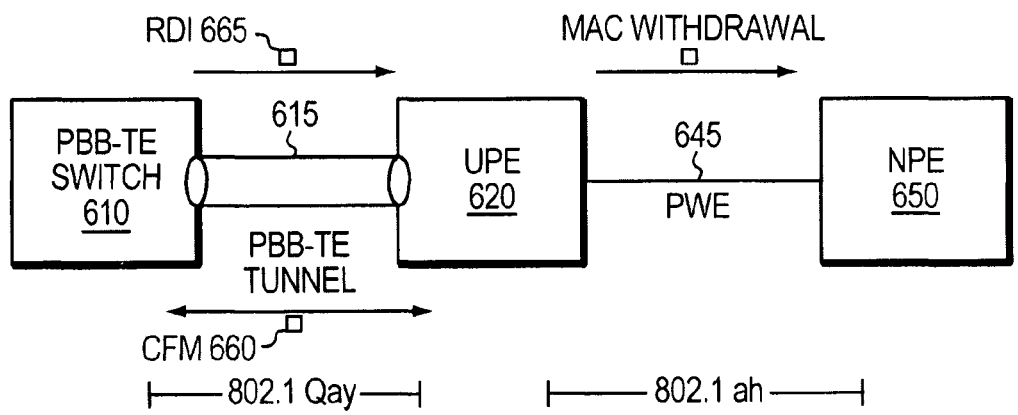
FIG. 6 is a block diagram of a user-facing provider edge (UPE) node according to an embodiment of the invention.

FIG. 6 is a block diagram of a user-facing provider edge (UPE) node according to an embodiment of the invention. A UPE 620 maintains CFM signaling with a PBB-TE switch 610 across a PBB-TE tunnel 615. In the event of a tunnel failure, the PBB-TE switch 610 sends a remote defect indication (RDI) 665 to the UPE 620 and switches to a protection path (to a different UPE). The UPE 620 also maintains CFM signaling with an NPE 650 across PWE interface 645, for similar dual homing purposes. If a PBB-TE tunnel is created or experiences a failure, The UPE 620 sends a MAC withdrawal signal 670 to the NPE 650 to force MAC address flushing and re-learning.

Figure 7:
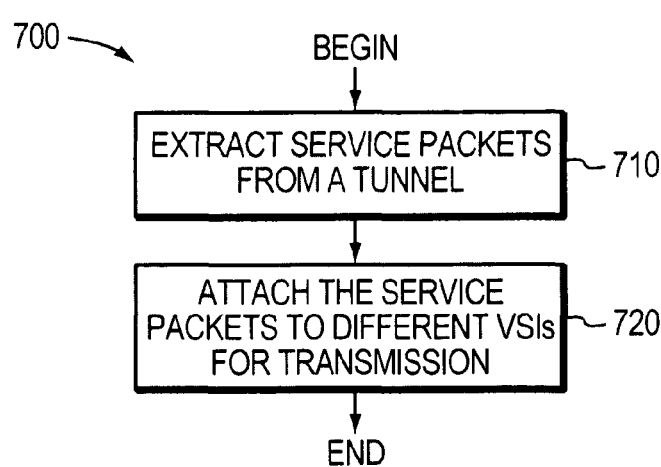
FIG. 7 is a flow diagram of a method performed at a user-facing provider edge (UPE) node according to an embodiment of the invention.

FIG. 7 is a flow diagram of a method performed at a user-facing provider edge (UPE) node according to an embodiment of the invention. The UPE extracts (710) service packets from a tunnel corresponding to a first protocol providing Ethernet carrier-class traffic engineering (e.g., PBB-TE). The UPE attaches (720) the service packets to different VSIs for transmission according to a second protocol that provides emulated LAN service across a WAN or MAN to provide point-to-point and point-to-multipoint services between end nodes.

Figure 8:
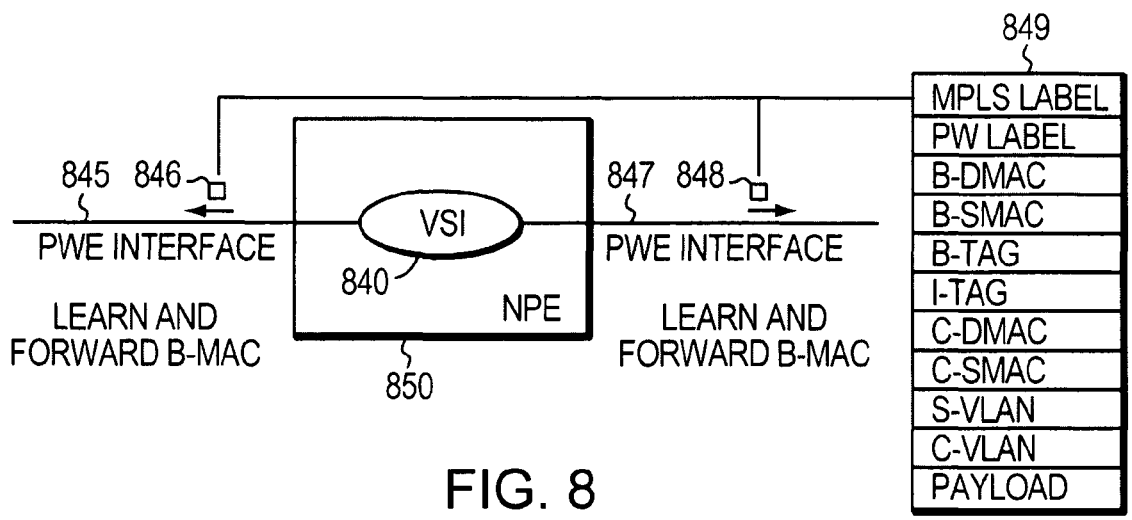
FIG. 8 is a traffic diagram that illustrates functionality of a network-facing provider edge (NPE) node according to an embodiment of the invention.

FIG. 8 is a traffic diagram that illustrates functionality of a network-facing provider edge (NPE) node according to an embodiment of the invention. An NPE 850 has incoming and outgoing PWE interfaces 845 and 847, respectively, on which frames 846 and 848 may be sent according to VPLS encapsulation 849. The NPE 850 learns and switches using backbone MAC addresses instead of customer MAC addresses. The NPE 850 forwards MAC withdrawal signals (received from a UPE node) corresponding to a change in topology. This helps the rest of the network to converge quickly. MAC withdrawal forwarding is performed only on the VSIs affected by the change in topology, rather than on the entire VPLS network, to promote efficient convergence. The NPE 850 includes other standard VPLS functionality as is known in the art.

Figure 9:
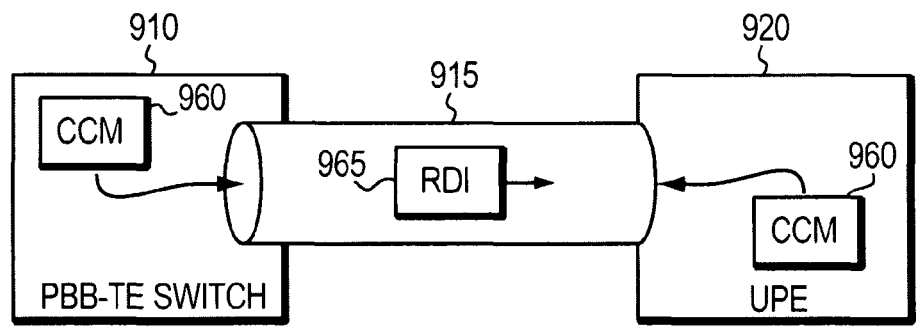
FIG. 9 is a network diagram that illustrates connectivity fault management (CFM) signaling according to an embodiment of the invention.

FIG. 9 is a network diagram that illustrates connectivity fault management (CFM) signaling according to an embodiment of the invention. A PBB-TE switch 910 expects to receive a Continuity Check Message (CCM) 960, according to 802.1ag, at a predetermined interval, e.g., 3 ms. This mechanism promotes fast MAC bridging convergence, as opposed to waiting for expiration of an aging timer, which could also be used to determine stale or obsolete MAC addresses. In an event of primary path failure, including node failure of a UPE 920, the CCM 960 is not received at a PBB-TE switch 910, and a trigger for a backup path is initiated. In some embodiments, three consecutive CCMs 960 must be lost in order to declare a path failure. In this way, a backup PBB-TE tunnel may be used to protect a primary tunnel. In some embodiments, transmission may revert to the primary tunnel after the fault is corrected in that tunnel (revertive behavior). In other embodiments, non-revertive behavior may be used. The PBB-TE switch 910, not the UPE 920, performs the function of switchover from a primary to a backup tunnel.

Figure 10:
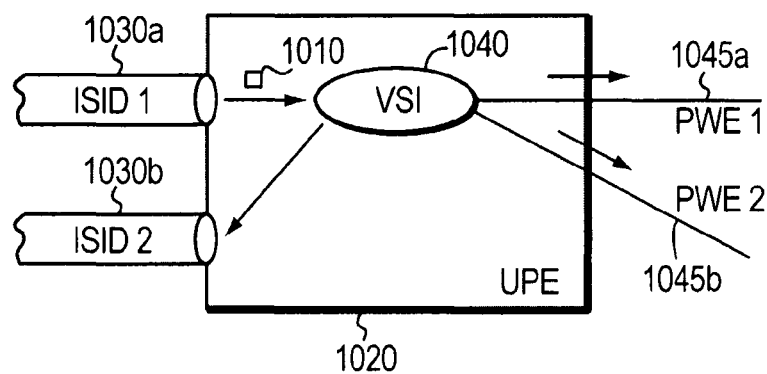
FIG. 10 is a traffic diagram that illustrates a technique for multicast transmission according to an embodiment of the invention.

FIG. 10 is a traffic diagram that illustrates a technique for multicast transmission according to an embodiment of the invention. A UPE 1020 may terminate an incoming PBB-TE tunnel which includes ISID 1 and 2, denoted 1030*a* and 1030*b*, respectively. The UPE 1020 attaches a frame 1010 intended for multicast transmission to VSI 1040, which may then flood the frame 1010 on all tunnels, pseudowires, or ports. In this example, flooding occurs on PWE interfaces 1045*a* and 1045*b* and ISID 2 1030*b*.

Embodiments or aspects of the invention may be implemented in hardware, firmware, or software. if implemented in software, the software may be implemented in any software language capable of performing the embodiment(s) of the invention. The software may be stored on any computer-readable medium, such as RAM, ROM, CD-ROM, and so forth. The software includes instructions that can be loaded and executed by a general purpose or application specific processor capable of supporting embodiment(s) of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method of supporting network communications, the method comprising:
provisioning a user provider edge (UPE) node in an aggregation network to support both a first protocol, providing point-to-point services, and a second protocol providing point-to-point and point-to-multipoint services, and further provisioning the UPE node to enable at least one intermediate node in the aggregation network to learn customer addresses to provide multipoint switching of user frames within the aggregation network and across a core network; and
provisioning network provider edge (NPE) nodes in a core network to support encapsulation and functionality according to the second protocol to support network communications between end nodes communicating with each other via the aggregation and core networks.

2. The method of claim 1, wherein the first protocol is Provider Backbone Bridge Traffic Engineering (PBB-TE) and the second protocol is Virtual Private LAN Service (VPLS).

3. The method of claim 2, further including provisioning primary and backup PBB-TE tunnels between an access-side edge node and parallel UPE nodes.

4. The method of claim 3, further including enabling the UPE node to issue a media access control (MAC) address withdrawal signal following an instantiation of one of the PBB-TE tunnels.

5. The method of claim 3, further including enabling the UPE node to issue a media access control (MAC) address withdrawal signal to a corresponding NPE node in an event of detecting a fault in one of the primary or backup PBB-TE tunnels.

6. The method of claim 5, further including:
monitoring for a continuity check message (CCM) failure; and
issuing the MAC address withdrawal signal in response to detecting the CCM failure.

7. The method of claim 6, further including sending a remote defect indication (RDI) from the access-side edge node to the UPE node in response to detecting the CCM failure.

8. The method of claim 2, further including enabling customer media access control (MAC) address learning on instance service identification (ISID) values belonging to a PBB-TE tunnel.

9. The method of claim 2, further including:
instantiating a PBB-TE tunnel between the UPE node and the access-side edge node;
extracting service packets from the PBB-TE tunnel;
provisioning multiple virtual switching instances (VSIs) between NPE nodes in the core network;
maintaining a table in the UPE node that includes a mapping between instance service identification (ISID) values and VSIs; and
attaching the service packets to different VSIs in the core network based on data retrieved from the table.

10. The method of claim 2, further including flooding a multicast frame, received on a PBB-TE tunnel, on all tunnels, pseudowires, or ports coupled to a virtual switching instance (VSI) in the UPE node.

11. The method of claim 1 further comprising provisioning an access-side edge node and the UPE node to support termination according to the first protocol between the access-side edge node and the UPE node, said termination including terminating, at the UPE node, a logical construct corresponding to the first protocol to enable forwarding of user frames from the aggregation network to at least two NPE nodes located at an ingress point of the core network.

12. The method of claim 11 wherein terminating the logical construct further includes enabling multipoint switching of the user frames and multicast bridging within the aggregation network to the at least two NPE nodes by extracting customer service information from the first protocol and matching the customer service information to the second protocol.

13. The method of claim 11 wherein the logical construct is a tunnel configured to carry intra-aggregation network communications.

14. A system supporting network communications, the system comprising:
a user provider edge (UPE) node in an aggregation network, the UPE node provisioned to support both a first protocol, providing point-to-point services, and a second protocol providing point-to-point and point-to-multipoint services, the UPE node further provisioned to at least one intermediate node in the aggregation network to learn customer addresses to provide multipoint switching of user frames within the aggregation network and across a core network; and
a plurality of network provider edge (NPE) nodes in the core network, the NPE nodes provisioned to support the first and second protocols to provide the point-to-point and point-to-multipoint services between end nodes configured to communicate with each other, the NPE nodes further provisioned to support encapsulation and functionality according to the second protocol to support network communications between the end nodes via the aggregation network and the core network.

15. The system of claim 14, wherein the first protocol is Provider Backbone Bridge Traffic Engineering (PBB-TE) and the second protocol is Virtual Private LAN Service (VPLS).

16. The system of claim 15, further including primary and backup PBB-TE tunnels provisioned between an access-side edge node of the aggregation network and parallel UPE nodes.

17. The system of claim 16, further including a withdrawal module to issue a media access control (MAC) address withdrawal signal from the UPE node following an instantiation of one of the PBB-TE tunnels.

18. The system of claim 16, further including a withdrawal module to issue a media access control (MAC) address withdrawal signal from the UPE node to a corresponding NPE node in an event of detecting a fault in one of the primary or backup PBB-TE tunnels.

19. The system of claim 18, further including:
a monitoring module to monitor for a continuity check message (CCM) failure; and wherein the withdrawal module issues the MAC address withdrawal signal in response to detecting the CCM failure.

20. The system of claim 19, further including a remote defect indication (RDI) module to send an RDI from the access-side edge node to the UPE node in response to detecting the CCM failure.

21. The system of claim 15, further including a learning module to learn customer media access control (MAC) addresses on instance service identification (ISID) values belonging to a PBB-TE tunnel.

22. The system of claim 15, further including:
an instantiation module to instantiate a PBB-TE tunnel between the UPE node and an access-side edge node of the aggregation network;
an extraction module to extract service packets from the PBB-TE tunnel;
a plurality of virtual switching instances (VSIs) provisioned between NPE nodes in the core network;
a table in the UPE node that includes a mapping between instance service identification (ISID) values and VSIs; and
an attachment module to attach the service packets to different VSIs in the core network based on data retrieved from the table.

23. The system of claim 15, further including a flooding module to flood a multicast frame, received on a PBB-TE tunnel, on all tunnels, pseudowires, or ports coupled to a virtual switching instance (VSI) in the UPE node.

24. The system of claim 14 wherein the UPE node is further provisioned to support termination according to the first protocol between an access-side edge node and the UPE node, said termination including terminating, at the UPE node, a logical construct corresponding to the first protocol to enable forwarding of user frames from the aggregation network to at least two NPE nodes located at an ingress point of the core network.

25. The system of claim 24 wherein the UPE node is further provisioned to support termination according to the first protocol the logical construct to enable multipoint switching of the user frames and multicast bridging within the aggregation network to the at least two NPE nodes by extracting customer service information from the first protocol and matching the customer service information to the second protocol.

26. The system of claim 24 wherein the logical construct is a tunnel configured to carry intra-aggregation network communications.

27. A method of supporting network communications, the method comprising:
extracting, at a user provider edge (UPE) node in an aggregation network, service packets from a logical construct corresponding to a first protocol, providing point-to-point services, extracting enabling at least one intermediate node in the aggregation network to learn customer addresses to provide multipoint switching of user frames within the aggregation network and across a core network; and
attaching the service packets to different virtual switching instances (VSIs) in the core network for transmission according to a second protocol providing point-to-point and point-to-multipoint services.

28. The method of claim 27, wherein the first protocol is Provider Backbone Bridge Traffic Engineering (PBB-TE) and the second protocol is Virtual Private LAN Service (VPLS).

29. The method of claim 28, further including issuing a media access control (MAC) address withdrawal signal following an instantiation of the PBB-TE tunnel.

30. The method of claim 28, further including issuing a media access control (MAC) address withdrawal signal in an event of detecting a fault in the PBB-TE tunnel.

31. The method of claim 30, further including:
monitoring for a continuity check message (CCM) failure; and
issuing the MAC address withdrawal signal in response to detecting the CCM failure.

32. The method of claim 31, wherein issuing the MAC address withdrawal signal is based on a remote defect indication (RDI) received at the UPE node from an access-side edge node of the aggregation network.

33. The method of claim 28, further including learning customer media access control (MAC) addresses on instance service identification (ISID) values belonging to the PBB-TE tunnel.

34. The method of claim 28, further including maintaining a table in the UPE node that includes a mapping between instance service identification (ISID) values and the VSIs, wherein attaching the service packets to different VSIs uses data retrieved from the table.

35. The method of claim 28, further including instantiating the PBB-TE tunnel between the UPE node and an access-side edge node of the aggregation network.

36. The method of claim 28, further including flooding a multicast frame, received on the PBB-TE tunnel, on all tunnels, pseudowires, or ports coupled to one of the VSIs.

37. A user provider edge (UPE) node in an aggregation network, the UPE node comprising:
an extraction module to extract service packets from a logical construct corresponding to a first protocol, providing point-to-point services, extraction of the service packets to enable at least one intermediate node in the aggregation network to learn customer addresses to provide multipoint switching of user frames within the aggregation network and across a core network; and
an attachment module to attach the service packets to different virtual switching instances (VSIs) in the core network for transmission according to a second protocol providing point-to-point and point-to-multipoint services.

38. The UPE node of claim 37, wherein the first protocol is Provider Backbone Bridge Traffic Engineering (PBB-TE) and the second protocol is Virtual Private LAN Service (VPLS).

39. The UPE node of claim 38, further including a media access control (MAC) withdrawal module to issue a MAC address withdrawal signal following an instantiation of the PBB-TE tunnel.

40. The UPE node of claim 38, further including a media access control (MAC) withdrawal module to issue a MAC address withdrawal signal in an event of detecting a fault in the PBB-TE tunnel.

41. The UPE node of claim 40, further including a monitoring module to monitor for a continuity check message (CCM) failure; and wherein the MAC withdrawal module issues the MAC address withdrawal signal in response to detecting the CCM failure.

42. The UPE node of claim 41, wherein the MAC address withdrawal module issues the MAC address withdrawal signal based on a remote defect indication (RDI) received at the UPE node from an access-side edge node of the aggregation network.

43. The UPE node of claim 40, further including a table that maps between instance service identification (ISID) values and the VSIs.

44. The UPE node of claim 40, further including a flooding module to flood a multicast frame, received on the PBB-TE tunnel, on all tunnels, pseudowires, or ports coupled to one of the VSIs.

45. The UPE node of claim 38, further including a learning module to learn customer media access control (MAC) addresses on instance service identification (ISID) values belonging to the PBB-TE tunnel.

* * * * *